US009077683B2

(12) United States Patent
Ringen (10) Patent No.: US 9,077,683 B2
(45) Date of Patent: Jul. 7, 2015

(54) ARCHITECTURE FOR NETWORK MANAGEMENT IN A MULTI-SERVICE NETWORK (75) Inventor: Deron Ringen, Acworth, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 830 days.

(21) Appl. No.: 12/963,340

(22) Filed: Dec. 8, 2010

(65) Prior Publication Data
US 2012/0151572 A1 Jun. 14, 2012

(51) Int. Cl.
G06F 21/00 (2013.01)
H04L 29/06 (2006.01)
H04L 12/24 (2006.01)
H04L 29/08 (2006.01)

(52) U.S. Cl.
CPC .......... *H04L 63/0209* (2013.01); *H04L 41/044* (2013.01); *H04L 63/0272* (2013.01); *H04L 63/08* (2013.01); *H04L 67/16* (2013.01); *G06F 2221/2113* (2013.01); *G06F 2221/2149* (2013.01); *G06F 2221/2141* (2013.01)

(58) Field of Classification Search
USPC ........................................................ 726/13
See application file for complete search history.

(56) References Cited

U.S. PATENT DOCUMENTS

| | | | |
|---|---|---|---|
| 6,341,127 B1 * | 1/2002 | Katsube et al. | 370/352 |
| 6,400,689 B1 | 6/2002 | Sato et al. | |
| 7,463,637 B2 | 12/2008 | Bou-Diab et al. | |
| 8,307,422 B2 * | 11/2012 | Varadhan et al. | 726/15 |
| 8,316,435 B1 * | 11/2012 | Varadhan et al. | 726/15 |
| 2005/0262264 A1 | 11/2005 | Ando et al. | |
| 2008/0310424 A1 | 12/2008 | Peterson et al. | |
| 2010/0043068 A1 * | 2/2010 | Varadhan et al. | 726/15 |
| 2010/0281171 A1 * | 11/2010 | Khasnabish | 709/227 |

OTHER PUBLICATIONS

Wikipedia, "Multiprotocol Label Switching", retrieved from http://en.wikipedia.org/wiki/Multiprotocol_Label_Switching on Nov. 10, 2010; This page was last modified on Oct. 31, 2010 at 14:48; Wikipedia is a registered trademark of the Wikimedia Foundation, Inc., a non-profit organization.

* cited by examiner

*Primary Examiner* — Lisa Lewis
*Assistant Examiner* — Maung Lwin
(74) *Attorney, Agent, or Firm* — Cantor Colburn LLP (57) ABSTRACT

A mechanism is provided for a non-converged network for a service provider. A core network is divided into individually managed domains, where each of the domains comprises multiprotocol label switching for packets. A management system is coupled to each of the domains. Network elements in each of the domains are restricted from directly transferring packets to network elements in another one of domains. Each of the domains has a domain firewall at an edge of the domains, and the domain firewall restricts packets from being received from other domains. To transfer packets from one domain to another domain, the management system receives the packets from one domain and transfers the packets to the other domain after authentication.

7 Claims, 5 Drawing Sheets

ARCHITECTURE FOR NETWORK MANAGEMENT IN A MULTI-SERVICE NETWORK

BACKGROUND

Exemplary embodiments relate to network management, and more specifically, to an architecture for providing management domains in a network.

A telecommunications network is a collection of terminals, links, and nodes which connect together to enable telecommunication between users of the terminals. Networks may use circuit switching or message switching. Each terminal in the network has a unique address so messages or connections can be routed to the correct recipients. The collection of addresses in the network is called the address space. The links connect the nodes together and are themselves built upon an underlying transmission network which physically pushes the message across the link.

Telecommunication networks may be made up of five basic components that are present in each network environment. These basic components may include terminals, telecommunications processors, telecommunications channels, computers, and/or telecommunications control software. Terminals are the starting and stopping points in any telecommunication network environment. Any input or output device that is used to transmit or receive data can be classified as a terminal component. Telecommunications processors support data transmission and reception between terminals and computers by providing a variety of control and support functions, i.e. convert data from digital to analog and back. Telecommunications channels are the way by which data is transmitted and received. Telecommunication channels are created through a variety of media of which the most popular include copper wires and coaxial cables. Fiber-optic cables are increasingly used to bring faster and more robust connections to businesses and homes.

Multiprotocol Label Switching (MPLS) is a mechanism in high-performance telecommunications networks which directs and carries data from one network node to the next. MPLS makes it easy to create "virtual links" between distant nodes. It can encapsulate packets of various network protocols. MPLS is a highly scalable, protocol agnostic, data-carrying mechanism. In an MPLS network, data packets are assigned labels. Packet-forwarding decisions are made solely on the contents of this label, without the need to examine the packet itself. This allows one to create end-to-end circuits across any type of transport medium, using any protocol. The primary benefit is to eliminate dependence on a particular Data Link Layer technology, and eliminate the need for multiple Layer 2 networks to satisfy different types of traffic. MPLS belongs to the family of packet-switched networks. It was designed to provide a unified data-carrying service for both circuit-based clients and packet-switching clients which provide a datagram service model. It can be used to carry many different kinds of traffic, including IP packets, as well as native Asynchronous Transfer Mode (ATM), Synchronous Optical Networking (SONET), and Ethernet frames.

BRIEF SUMMARY

According to exemplary embodiments, an architecture is provided for a non-converged network for a service provider. A core network is divided into individually managed domains, where each of the domains includes multiprotocol label switching for packets. A management system is coupled to each of the domains. Network elements in each of the domains are restricted from directly transferring packets to network elements in another one of domains. Each of the domains has a domain firewall at an edge of the domains, and the domain firewall restricts packets from being received from other domains. To transfer packets from one domain to another domain, the management system receives the packets from one domain and transfers the packets to the other domain after authentication.

According to exemplary embodiments, a management system for a non-converged network is provided. Memory stares a program and a processor is functionally coupled to the memory. The processor is responsive to computer-executable instructions contained in the program and operative to receive packets to transfer under multiprotocol label switching from one domain to another domain within a core network divided into individually managed domains. Each of the domains has a domain firewall at an edge of the domains to restrict packets from being received from other domains. The processor is operative to provide authentication to the domain firewall at the edge of the other domain and transfer packets received from the one domain to the other domain after authentication.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

DETAILED DESCRIPTION OF EXEMPLARY EMBODIMENTS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

DETAILED DESCRIPTION OF EXEMPLARY EMBODIMENTS

Exemplary embodiments provide an architecture for network management in a multi-service network which can be leveraged by a service provider that provides both Internet and private/virtual private networks (VPN) services (and other service) via a converged Internet Protocol (IP)/multiprotocol label switching (MPLS) network.

According to exemplary embodiments, to provide non-converged network, the management of the network for a single Internet service provider (ISP) is divided into three domains: Internet domain 10, private/VPN domain 20, and infrastructure domain 30 as discussed with reference to FIG. 3. The creation of separate domains 10, 20, and 30 provides an increased level of security in accordance with exemplary embodiments.

Figure 1:
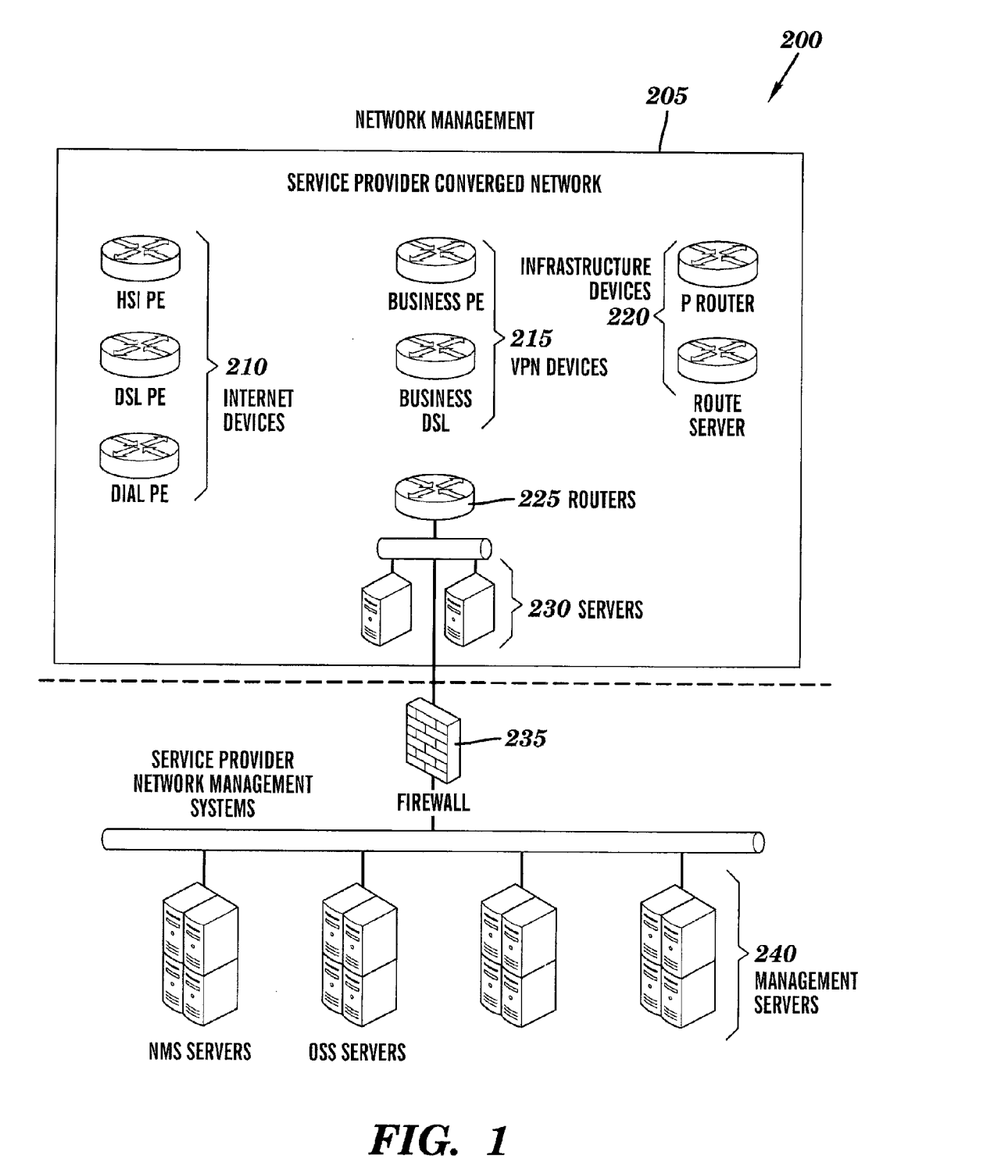
FIG. 1 illustrates an exemplary architecture.
Figure 2:
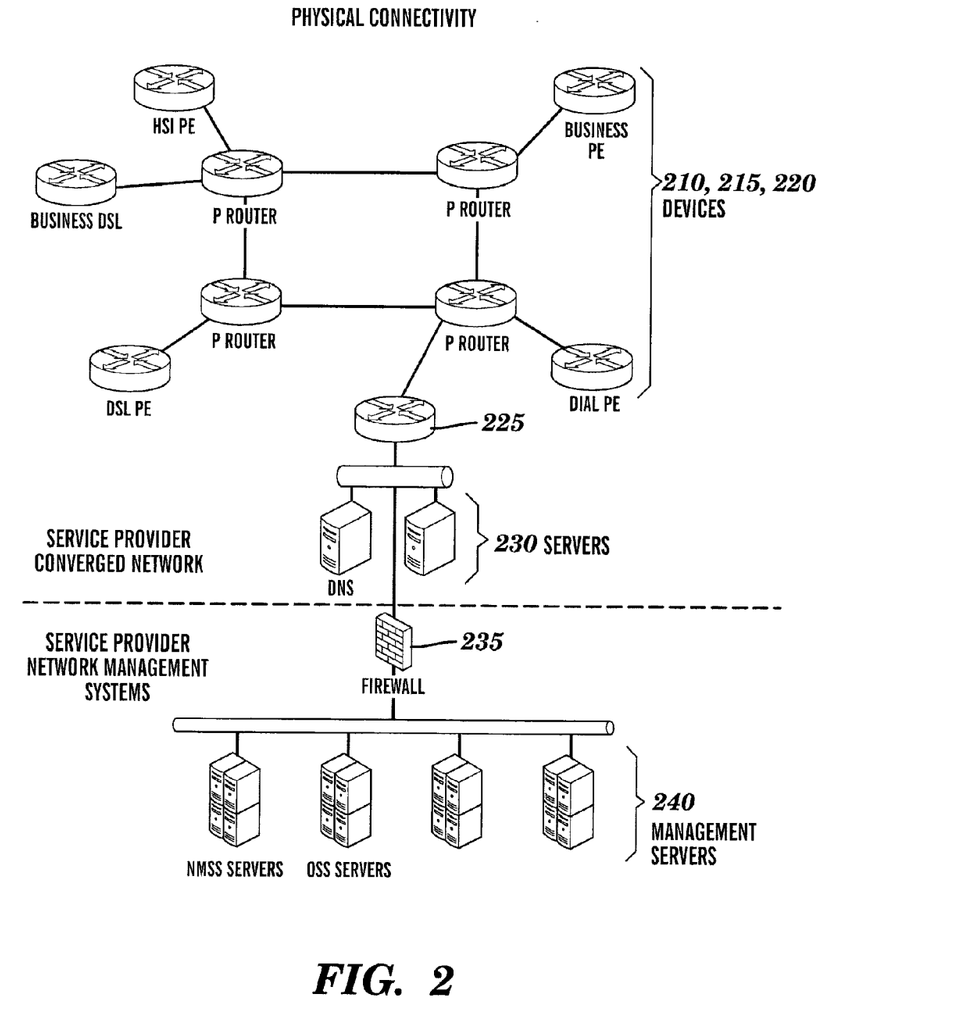
FIG. 2 illustrates an exemplary architecture.
Figure 3:
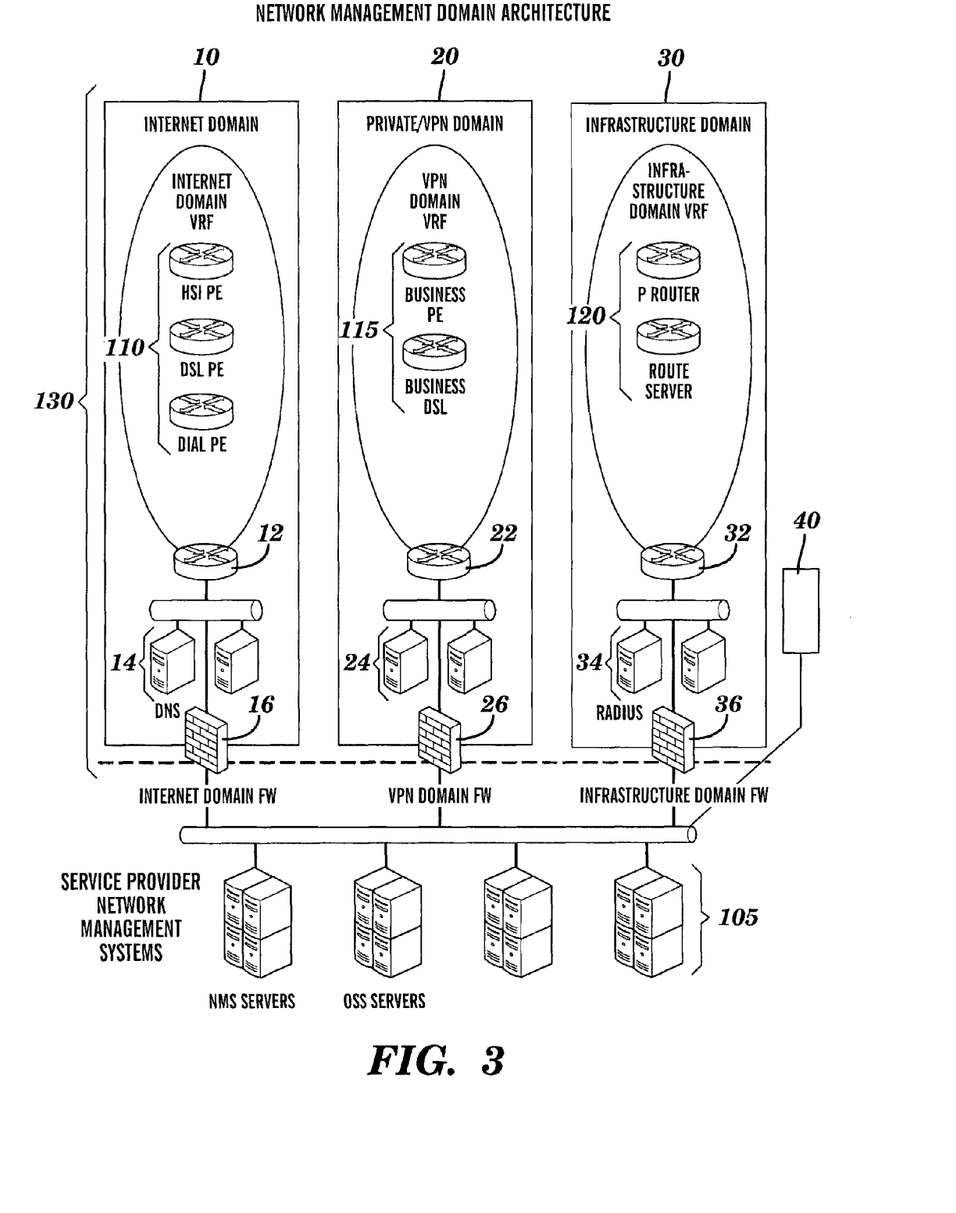
FIG. 3 illustrates a block diagram of an architecture in accordance with exemplary embodiments.

Note that FIGS. 1, 2, and 3 each represent an example of an entire network for a single service provider and does not illustrate connections to networks of other service providers.

With reference to FIGS. 1 and 2, when a service provider has created an exemplary converged network 205, private/VPN services have been added to networks that were originally created to support Internet services as shown in FIG. 1. When an ISP has the exemplary converged network 205, the converged network 205 is a single network of that ISP supporting and providing multiple services, such as Internet services, cell/mobile phone services (including towers, base transceiver station (BTS), base station controller (BSC), etc.), private/virtual private networks, television services, and other services at the IP/MPLS level. Converged at the IP/MPLS level does not refer to being converged at the fiber level (e.g., SONET level). Converged at the IP/MPLS level refers to how packets are distributed over the ISP's network. In the area of network management, having the exemplary converged network 205 (in which all services have packets flowing over the converged network 205) has created a security hole by mixing Internet devices 210 into the same network management domain as non-Internet devices such as private/VPN devices 215, infrastructure devices 220 and other service devices.

To date service providers (ISP) have used a single common network management domain such as the exemplary service provider converged network 205. This single common domain of the exemplary converged network 205 presents a security risk. A device of the Internet devices 210 that is compromised via the Internet would then place all other network elements in the domain of the single exemplary converged network 205 at risk. Note that in FIG. 1, the domain is the service provider's exemplary converged network 205, because the service provider converged network 205 is a single domain unlike FIG. 3. Although a single service provider (ISP) may connect its different networks (which may span across large geographical locations), the service provider still has a converged network 205 from an IP/MPLS standpoint in which multiple services are converged in the exemplary converged network 205 at some point in the network and/or at multiple points in the network to form the exemplary converged network 205 for transferring packets under MPLS for IP communications.

As discussed above, FIG. 1 illustrates the exemplary architecture 200 for an individual service provider (ISP) having the exemplary converged network 205, and FIG. 2 illustrates the physical connectivity for the exemplary architecture 200. In FIG. 1, the service provider has the exemplary converged network 205 including Internet devices 210, such as high speed Internet premise equipment (PE), digital subscriber line (DSL) premise equipment (PE), and dial up premise equipment (PE). The exemplary converged network 205 includes VPN devices 215, such as business PE, business DSL PE. The exemplary converged network 205 also includes infrastructure devices 220, such as P routers and route servers.

The exemplary converged network 205 may also include other routers 225 of various types and other servers 230 which represent various types of computing devices. A firewall 235 may separate management systems 240 such as management servers and equipment 240 from the service provider converged network 205.

Now turning to FIG. 3, FIG. 3 illustrates a non-converged architecture 100 for network management in a multi-service network for a service provider (ISP) in accordance with exemplary embodiments.

The architecture 100 depicts multiple network management domains 10, 20, and 30 via MPLS, which form a non-converged network 130. Each domain 10, 20, and 30 in the non-converged network implements its own untrusted security model in respective computing devices 14, 24, and 34 via firewalls 16, 26, and 36.

In this non-converged architecture 100, a converged IP/MPLS network such as converged network 205 is divided into three management domains for this example, and it is understood that the converged network 205 may be divided into further domains based on the services provided to form the non-converged network 130. The non-converged network 130 represents all network elements above the dashed line.

In the Internet network management domain 10, network elements that support Internet services and/or that can be access from the Internet are assigned to this Internet domain 10. The assigned Internet domain devices 110 which are all network elements may include servers, routers, switches, hubs, gateways, and other equipment for supporting and providing Internet service, along with HSI PE, DSL PE, and dial up PE.

In the private/VPN network management domain 20, network elements that support business, VPN, and any other service that does not directly access the Internet are assigned to this private/VPN domain 20. The assigned VPN domain devices 115 may include servers, routers, switches, hubs, gateways, and other equipment for supporting and providing VPN service (but not Internet service), along with business PE, and business DSL equipment.

In the infrastructure network management domain 30, network elements that support the non-converged network 130 as a whole are assigned to the infrastructure domain 30. The assigned infrastructure domain devices 120 include core routers, route servers, console servers, and P routers. Even though network elements in the infrastructure domain 30 may be physically connected to network elements in the other domains 10 and 20, the network elements in the infrastructure domain 30 are logically separated from network elements in domains 10 and 20. For example, packets, unless explicitly allowed, cannot cross domains.

If a network element, i.e., a device such as a router or server, supports both private/VPN services and Internet services, this particular network element is assigned to the Internet devices 110 in the Internet domain 10. If a network element terminates any customer connection, e.g., at the customer premises and/or directly connects to customer premises equipment, these network elements cannot be assigned to the infrastructure domain 30.

In accordance with exemplary embodiments, two types of network elements will be placed/assigned into domains 10, 20, and 30. These are MPLS enabled network elements and non-MPLS enabled elements. MPLS enabled network elements are configured to support VPN aware network management and are configured with a network management VPN and loopback IP address for management by the management systems 105 and/or the respective servers 14, 24, and 34. Additionally and/or alternatively, each of the MPLS enabled network elements may have a dedicated network management physical interface.

Non-MPLS enabled elements are configured to have a dedicated network management physical interface. Non-MPLS enabled elements are configured to access their respective domain via a MPLS enable elements. For example, a non-MPLS element does not support MPLS and hence cannot be configured with a network management VPN. As such, non-MPLS enabled elements are configured to have a dedicated network management physical interface.

The network elements in the Internet domain devices 110, VPN domain devices 115, and the infrastructure domain devices 120 may include both non-MPLS enabled elements and MPLS enabled elements. Note that devices 110, 115, 120, 12, 22, 32, 14, 24, and 34 may be utilized synonymously with network elements.

In exemplary embodiments, dedicated domain firewalls 16, 26, and 36 are utilized for each respective domain 10, 20, and 30. For example, this dedicated firewall 16 controls access to and from of the network management domain 10 and common network management systems 105. Likewise, the dedicated firewall 26 controls access to and from the domain 20 and the common network management systems 105, and the dedicated firewall 36 controls access to and from the domain 30 and the common network management systems 105. The network management systems 105 are trusted hosts and may be utilized synonymously with trusted hosts 105.

Each dedicated firewall 16, 26, and 36 is designed to (only) support one domain 10, 20, and 30 respectively, which is the network management domain it is assigned to.

As mentioned above, each domain 10, 20, and 30 utilizes an untrusted security model. In the untrusted security model, no network element is trusted. That is, no device in the Internet domain devices 110 is trusted, no device in the VPN domain devices 115 is trusted, and no device in the infrastructure domain devices 120 is trusted. Hence, authentication, authorization, and accounting (AAA) must be used in every aspect of network management for each of the domains 10, 20, and 30, and each management system 105 has to have authentication, authorization, and accounting (AAA) by a respective firewall 16, 26, or 36 before it can transfer packets into the desired domain 10, 20, or 30. Also, each device 115 within a particular domain such as domain 115 must have AAA before it can transfer packets to other devices 115 within that particular domain 115. The untrusted security model, the respective dedicated firewall 16, 26, and 36, and network management may be implemented in the servers 14 for domain 10, the servers 24 for domain 20, and the servers 34 for domain 30.

According to exemplary embodiments, the untrusted security model may include one or more of the following features:

All network elements 12, 14, 22, 24, 32, 34, 110, 115, and 120 require AAA access regardless of their respective domains 10, 20, and 30.

All network elements 12, 14, 22, 24, 32, 34, 110, 115, and 120 can restrict access to their respective domains 10, 20, 30 and their own computer system based on source IP address of the management system 105, i.e., trusted host. For example, each device 115 within the VPN domain 20 can restrict access to itself from network elements outside of the VPN domain 20 and/or from other network elements within the VPN domain 20; this restriction may be based on source IP address, source or destination port number or other, and/or any an offset of the payload.

Access to a domain 10, 20, or 30 does not allow unauthenticated access to each element 12, 14, 22, 24, 32, 34, 110, 115, and 120 within that domain. For example, even if a network element, such as the trusted host management system 105 has passed the firewall 26 via AAA, that trusted host management system 105 does not have unauthenticated access to the VPN domain devices 115, and the trusted host management system 105 may have to AAA again to access any, e.g., particular server/router in the VPN domain devices 115 such as to access the business PE and the business DSL device. This also applies for domains 10 and 30 or any other domains in the non-converged 130.

Access to elements in the domains 10, 20, and 30 are (only) allowed via secured methods from operation centers such as the management systems 105. The network management systems 105, i.e., trusted hosts, are allowed to access each domain via a secure method, such as AAA. However, the domains 10, 20, and 30 do now allow (direct and/or any) element-to-element access from one domain to another domain. For example, a computing device (e.g., 110) in the Internet domain 10 cannot transmit a MPLS packet directly to a computing device (e.g., 115) in the VPN domain 20, and vice versa. Instead, the MPLS packets from the Internet domain 10 would have to be transferred to one of the management systems 105, and that trusted host management system 105 transfers those MPLS packets to the VPN domain 20 though the dedicated firewall 26 after AAA. In one implementation, even if the MPLS packets from the Internet domain 10 are transferred to one of the trusted host management systems 105, the dedicated firewall 26 for the VPN domain 20 would not allow the trusted host management system 105 to transfer those MPLS packets to domain 20 even after AAA because of the IP source of the MPLS packets being from the Internet domain 10.

As discussed herein, by this non-converged architecture 100, exemplary embodiments provide improved security by separating the network elements into separated network management domains 10, 20, and 30. By creating separate domains 10, 20, and 30, the security risk to each individual domain is reduced. Also, high risk domains, such as the Internet domain 10, are isolated from low risk domains, such as the infrastructure domain 30. Accordingly, the risk to the low risk network elements, e.g., in domains 20 and 30, is reduced. In addition, following an untrusted security model tightens the security requirements for all network elements in each domain and increases the level of security that is achievable.

With reference to FIG. 3, all items above the dashed line are the core network of this service provider's non-converged network 130. Each domain 10, 20, and 30 is part of the core and has its own respective firewall 16, 26, and 36 preventing any incoming packets from reaching the domain. However, in FIGS. 1 and 2, there is a single firewall 235. Once incoming MPLS packets pass the firewall 235, there is no separation of domains unlike, e.g., domains 10, 20 and 30 in FIG. 3 which provide additional firewalls and additional security as described for exemplary embodiments.

Note that since FIGS. 1, 2, and 3 illustrate architectures for an individual service provider, and it is understood that individual customers who utilize the network of the service provider may have his own firewall and security measures in place. However, individual customers cannot control the exemplary core converged network 205 of a service provider in FIG. 1 to cause the service provider to have a separate Internet domain 10, private/VPN domain 20, and/or infrastructure domain 30 throughout the service provider's network in which MPLS packets cannot freely pass among the domains 10, 20, and 30 as illustrated in FIG. 3. Even if a customer required a secure network at a secure facility, that customer controls its own secure network which may cover large geographical distances but the customer does not cause the service provider in FIG. 1 to create multiple domains in the exemplary service provider converged network 205 such that different services offered by the service provider are now in different domains as disclosed herein. That customer also does not cause the service provider network management systems 240 to AAA packets from Internet services, cell phone services, other virtual private networks, etc., before entering the secure network at the secure facility, as exemplary embodiments would.

Also, in the exemplary converged network 205 of FIG. 1, the service provider may have multiple firewalls on various devices within the service provider's converged network 205. However, that service provider does not divide its core network into separate domains based upon the services offered such that the service provider has a separate Internet domain 10, private/VPN domain 20, and/or infrastructure domain 30, where each domain 10, 20, and 20 has its own firewall 16, 26, and 36 sitting at the edge of that domain as in FIG. 3. Additionally, if the exemplary converged network 205 has firewalls scattered/dispersed throughout its converged network 205, those firewalls are not managed on a per domain basis (as shown in FIG. 3) to restrict MPLS packets from entering those domains, e.g., domains 10, 20, and 30 in the non-converged network 130, because MPLS packets freely flow in the converged network 205 lacking the individually managed domains. Further, multiple service providers each having a converged network may have firewalls and/or security between each other, without dividing their own core network into domains as disclosed herein. For example, in the exemplary converged network 205, the service provider may offer television/cable services, Internet services, cell phone services, etc. Although at certain points these services may not be collectively available in all geographical locations, any (temporary) separation of these services (i.e., television/cable services, Internet services, cell phone services) is removed at the exemplary service provider converged network 205 in which MPLS packets from one service network of that service provider can directly flow to another service network of that service provider without being subjected to the security of individually managed domains according to exemplary embodiments. For example, in the exemplary converged IP/MPLS network 205 having, e.g., a cell phone system, an Internet system, and a television system, there maybe a certain degree of separation created by the separate systems for cell phone, Internet, and television. However, once the exemplary converged IP/MPLS network 205 is leveraged, then all devices such as devices 210, 215, and 220 in the cell phone, Internet, and television systems would be in the same management domain (e.g., 205). This may be considered undesirable due to security concerns, especially from the Internet services network elements, i.e., devices 210. By creating management domains 10, 20, 30 and other domains 40 according to exemplary embodiments as illustrated in FIG. 3, this security concern is removed; and the separation of the non-converged network 130 is leveraged in a manner for managing the transfer of MPLS packets into the domains 10, 20, and 30 according to exemplary embodiments.

In exemplary embodiments, the non-converged network 130 is configured with firewalls 16, 26, and 36 on computing devices 14, 24, and 34 to divide each service such as television/cable services, Internet services, cell phone services, and business services into its own individual domain that is separately managed and that requires management systems 105 to transfer packets from domain-to-domain and/or element-to-element across the different domains.

As discussed above, the exemplary converged IP/MPLS network 205 is a network that is converged at the IP/MPLS level and hence shares common IP/MPLS network elements, optical network elements, and fibers. A network that is not converged at an IP/MPLS level such as the non-converged network 130 would have separate IP/MPLS networks elements as shown in domains 10, 20, and 30 for various services such as cell phone service in a first domain, television service in second domain, Internet service in a third domain, business private/VPN service in a fourth domain, etc.; all of the domains would be managed individually as discussed herein for exemplary embodiments such that MPLS packets from a device in one domain are not directly transferred to another device in another domain. It is understood that MPLS packets are routed over various routers, servers, optical network elements, etc.; this type of routing is still considered directly transferring packets and does not make the exemplary converged network 205 into the non-converged network 130 according to exemplary embodiments. However, indirect transferring of packets in exemplary embodiments causes MPLS packets from one device in, e.g., domain 10 to be transferred to trusted hosts such as management systems 105 so that the management systems 105 can then (re)transmit the MPLS packets from the device in domain 10 to another device, e.g., in domain 30 (which may be a cell phone domain in one scenario), under an untrusted security model. Thus, the management domains 10, 20, and 30 are configured as a solution for IP security issues on converged networks.

Note that additional domains 40 represent a plurality of different service domains offered by the service provider of the non-converged network 130, and each additional domain 40 includes its own dedicated firewall and assigned servers, routers, PEs, etc. as discussed herein for domains 10, 20, and 30. Likewise, the additional domains 40 require AAA for their respective devices, require access through the management systems 105 to transmit MPLS packets into the additional domains 40, and operate under the untrusted security model as discussed herein.

Figure 4:
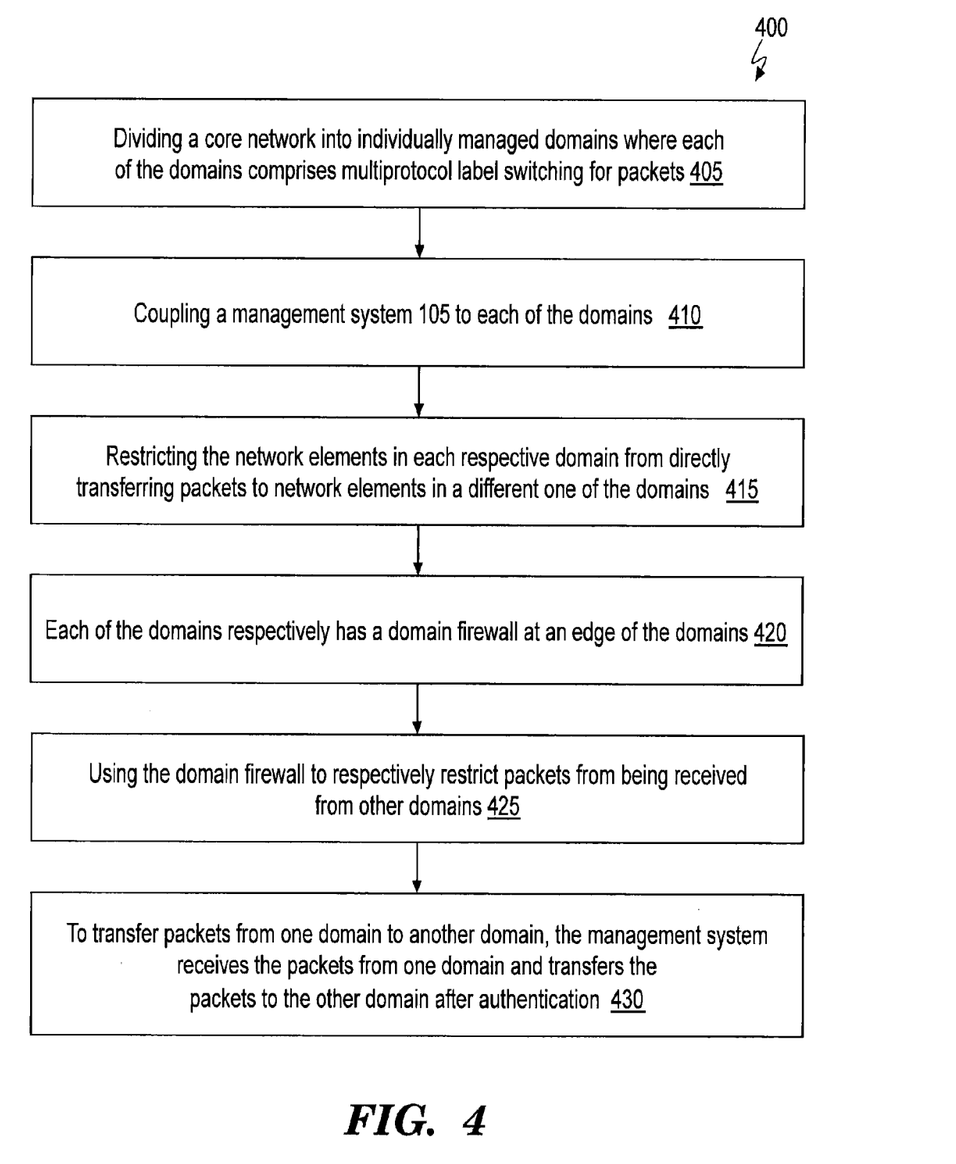
FIG. 4 illustrates a flow chart in accordance with exemplary embodiments.

FIG. 4 illustrates a flow chart 400 for providing the non-converged network 130 of a single service provider who offers multiple services in which each service has its own individually managed domain according to exemplary embodiments. In one implementation, a computer program product having one or more software applications in the management systems 105 is configured to cause the flow chart 400 to be implemented by monitoring and reviewing each service of a service provider and instructing the service provider on how to create a non-converged network 130 according to exemplary embodiments, which may include a user inputting service information and following instructions provided by the management systems 105; the management systems 105 may graphically display a logical view of network elements for dividing a converged network 205 into the non-converged network 130 which can then be employed by the service provider. Also, when converting a converged network into the non-converged network 130 and after reviewing each network element and service in the converged network, the management system 105 is configured to assign and determine which devices in the non-converged network 130 should be assigned to the different domains 10, 20, and 30 and any additional domains 40. The management systems 105 may also determine how many different domains should be provided in the non-converged network 130.

Now referring back to FIG. 4, at block 405, a core network such as the network elements above the dashed line in FIG. 1 is divided into individually managed domains 10, 20, 30, where each of the domains comprises multiprotocol label switching for packets in Internet protocol communications. For example, devices 12, 22, 32, 14, 24, 34, 110, 115, and 120 are MPLS enabled and/or are connected to an MPLS enabled device to communicates MPLS packets for IP communications.

At block 410, a management system 105 is coupled to each of the domains 10, 20, and 30.

At block 415, the network elements in each respective domain 10, 20, and 30 are restricted from directly transferring packets to network elements in a different one of the domains 10, 20, and 30.

At block 420, each of the domains 10, 20, and 30 respectively has a domain firewall 16, 26, or 36 at an edge of the domains 10, 20, and 30. Note that although a single domain firewall 16, 26, or 36 is shown for each domain 10, 20, and 30 in FIG. 1, it is appreciated more than one firewall may be at various edges of each domain to restrict access into that particular domain offering a particular service.

At block 425, the domain firewall 16, 26, and 36 respectively restricts packets from being received from other domains.

At block 430, to transfer packets from one domain 10, 20, and 30 to another domain 10, 20, and 30, the management system 105 receives the packets from one domain and transfers the packets to the other domain after authentication.

Further, the service provider is a single service provider having its core network divided into individually managed domains 10, 20, and 30. The domains 10, 20, and 30 each have assigned devices 12, 22, 32, 14, 24, 34, 110, 115, and 120 generally called network elements, such as servers, routers, optical elements, etc., and the service provider utilizing, e.g., firewalls 16, 26, and 36 in computing devices 14, 24, and 34 blocks transferring of MPLS packets among assigned devices of different domains. The domains are divided into service domains such that each service domain comprises a single service (e.g., cell phone service, business private/VPN services for various businesses, television services, Internet services) provided by the service provider, and the assigned devices in one service domain only transfers packets within that one service domain; as such, that one service domain blocks packets from assigned devices in another service domain from entering that one service domain. One of the domains is an Internet domain 10 and network elements assigned to the Internet domain 20 in the core network are restricted from directly transferring packets to other domains in the core network, which causes the Internet domain to be isolated from the other domains.

The domain firewall 16, 26, and 36 at the edge of each of the domains 10, 20, and 30 acts to isolate each domain from another when transferring packets under multiprotocol label switching for Internet protocol communication. To control MPLS packet transfer, the domains are coupled by fiber to the management system 105 in order for the management system 105 to transfer packets to the domains under multiprotocol label switching for Internet protocol communication. The management system 105 sits opposing each of the domains and is outside of the domain firewall for each of the domains. The management system 105 requires authentication, authorization, and accounting to the domain firewall protecting a particular domain each time the management system needs to transfer packets to the particular domain from a different domain.

Figure 5:
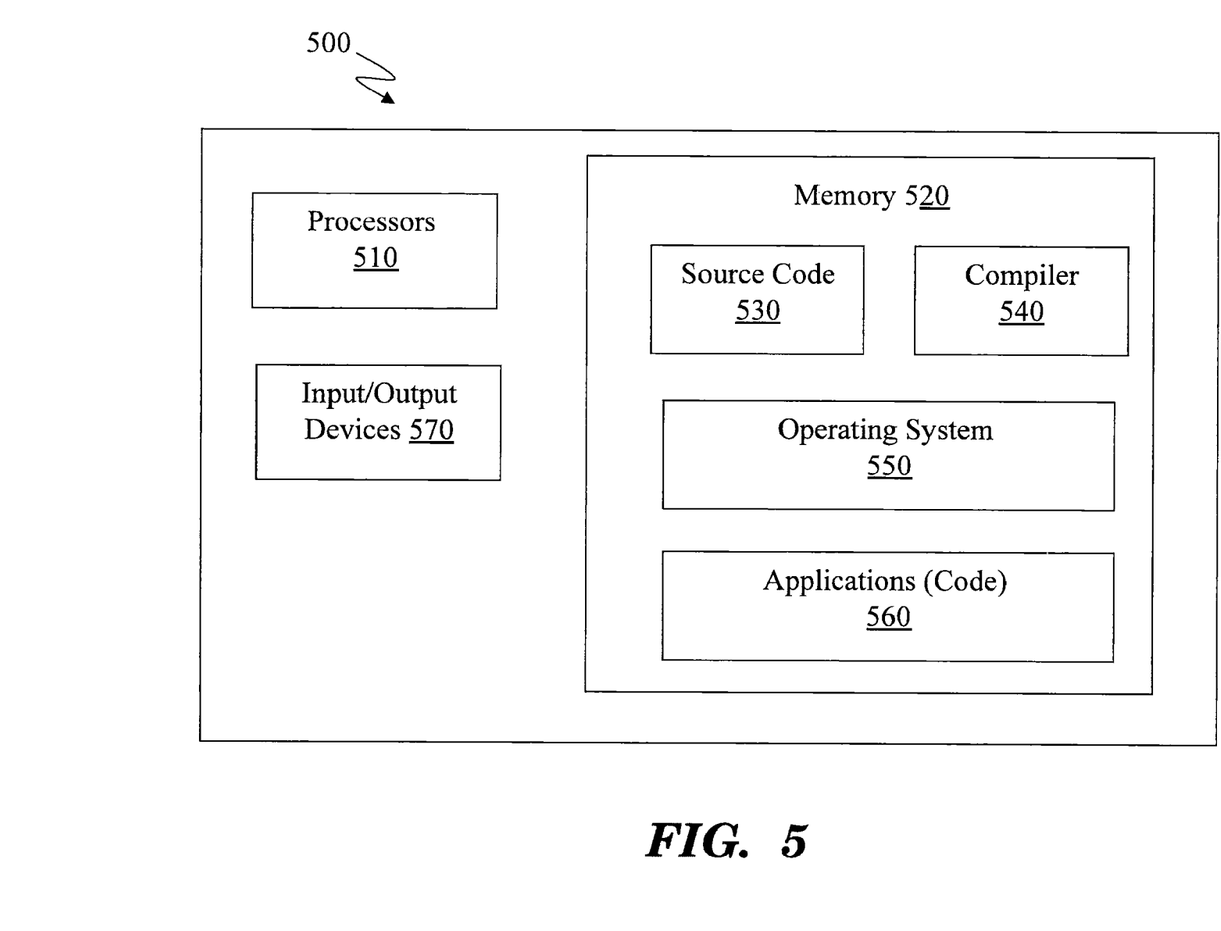
FIG. 5 illustrates an example of a computer having capabilities, which may be included in exemplary embodiments.

FIG. 5 illustrates an example of a computer 500 having capabilities, which may be included in exemplary embodiments. Various methods, procedures, modules, flow diagrams, tools, application, architectures, systems, views, and techniques discussed herein may also incorporate and/or utilize the capabilities of the computer 500. Moreover, capabilities of the computer 500 may be utilized to implement features of exemplary embodiments discussed herein. One or more of the capabilities of the computer 500 may implement any element discussed herein such as in above FIGS. 1-4.

Generally, in terms of hardware architecture, the computer 500 may include one or more processors 510, computer readable storage memory 520, and one or more input and/or output (I/O) devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500, and the processor 510 may be a semiconductor based microprocessor (in the form of a microchip) or a macroprocessor.

The computer readable memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the computer readable memory 520 may include one or more separate programs, each of which comprises an ordered listing of executable instructions for implementing logical functions. The software in the memory 520 includes a suitable operating system (O/S) 550, compiler 540, source code 530, and one or more applications 560 of the exemplary embodiments. As illustrated, the application 560 comprises numerous functional components for implementing the features, processes, methods, functions, and operations of the exemplary embodiments. The application 560 of the computer 500 may represent numerous applications, agents, software components, modules, interfaces, controllers, etc., as discussed herein but the application 560 is not meant to be a limitation.

The operating system 550 may control the execution of other computer programs, and provides scheduling, input-output control, file and data management, memory management, and communication control and related services.

The application(s) 560 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as (a) an object oriented programming language, which has classes of data and methods, or (b) a procedure programming language, which has routines, subroutines, and/or functions.

The I/O devices 570 may include input devices (or peripherals) such as, for example but not limited to, a mouse, keyboard, scanner, microphone, camera, etc. Furthermore, the I/O devices 570 may also include output devices (or peripherals), for example but not limited to, a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or an intranet. The I/O devices 570 may be connected to and/or communicate with the processor 105 utilizing Bluetooth connections and cables (via, e.g., Universal Serial Bus (USB) ports, serial ports, parallel ports, FireWire, HDMI (High-Definition Multimedia Interface), etc.).

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 560 can be embodied in any computer-readable medium 520 for use by or in connection with an instruction execution system, apparatus, server, or device, such as a computer-based system, processor-containing system, or other system that can fetch the instructions from the instruction execution system, apparatus, or device and execute the instructions.

Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

In exemplary embodiments, where the application 560 is implemented in hardware, the application 560 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 500 includes non-limiting examples of software and hardware components that may be included in various devices, servers, routers, switches, and systems discussed herein, and it is understood that additional software and hardware components may be included in the various devices and systems discussed in exemplary embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for providing a non-converged network for a single service provider, comprising:
    dividing a core network into individually managed domains comprising an internet network management domain, a private network management domain, a television services domain, and cell phone services domain, wherein each of the individually managed domains comprises multiprotocol label switching for packets;
    coupling a management system to each of the individually managed domains, the management system being a trusted host outside of the internet network management domain, outside the private network management domain, and outside the infrastructure network management domain;
    restricting network elements in each of the individually managed domains from directly transferring the packets to network elements in another one of the individually managed domains;
    configuring respective domain firewalls at an edge of the individually managed domains in order to individually protect the internet network management domain by an internet domain firewall in a first computing device, to individually protect the private network management domain by a private network domain firewall in a second computing device, to individually protect the cell phone services domain by a cell phone domain firewall in a third computing device, and to individually protect the television services domain by a television domain firewall in a fourth computing device;
    wherein the first, second, third, and fourth computing devices are separate computing devices from one another;
    configuring the management system to be outside of and not include the respective domain firewalls, the respective domain firewalls restricting the packets from being received from other domains; and
    to transfer the packets from one domain to another domain, receiving by the management system the packets from one domain in order to transfer the packets to the other domain after authentication.

2. The method of claim 1, wherein the individually managed domains each have assigned devices being network elements;
    wherein the single service provider blocks transferring of the packets among the assigned devices of different domains; and
    wherein the management system does not comprise the internet domain firewall, the private network domain firewall, and the infrastructure domain firewall.

3. The method of claim 1, wherein the individually managed domains are divided into service domains such that each service domain comprises a single service provided by the single service provider;
    wherein assigned devices in one service domains only transfers the packets within the one service domain; and
    wherein the one service domain blocks the packets from the assigned devices in another service domain from entering the one service domain.

4. The method of claim 1, wherein the respective domain firewalls at the edge of each of the individually managed domains act to isolate each of the individually managed domains from another domain within the core network.

5. The method of claim 1, wherein the respective domain firewalls at the edge of each of the individually managed domains act to isolate each of the individually managed domain from another domain when transferring the packets under multiprotocol label switching for internet protocol communication; and
    wherein the individually managed domains are coupled by fiber to the management system in order for the management system to transfer the packets to the individually managed domains under multiprotocol label switching for internet protocol communication.

6. The method of claim 1, wherein the management system sits opposing each of the individually managed domains and is outside of the respective domain firewalls for each of the individually managed domains.

7. The method of claim 1, wherein the management system requires authentication, authorization, and accounting to the respective domain firewalls protecting a particular domain each time the management system needs to transfer the packets to the particular domain from a different domain.

* * * * *